US006803810B2

United States Patent
Yamada et al.

(10) Patent No.: US 6,803,810 B2
(45) Date of Patent: Oct. 12, 2004

(54) SEMICONDUCTOR DEVICE AND PORTABLE TERMINAL EQUIPMENT

(75) Inventors: Yoshikazu Yamada, Kawasaki (JP); Koichi Kuroiwa, Kawasaki (JP); Shoji Taniguchi, Kawasaki (JP); Takanobu Kashiwagi, Kanagawa (JP)

(73) Assignee: Fujitsu Limited, Kanagawa (JP)

( * ) Notice: Subject to any disclaimer, the term of this patent is extended or adjusted under 35 U.S.C. 154(b) by 44 days.

(21) Appl. No.: 10/300,592

(22) Filed: Nov. 21, 2002

(65) Prior Publication Data

US 2003/0133337 A1 Jul. 17, 2003

(30) Foreign Application Priority Data

Jan. 15, 2002 (JP) .................................. 2002-006406

(51) Int. Cl.[7] .............................................. G05F 1/10
(52) U.S. Cl. ....................................................... 327/544
(58) Field of Search ................................ 327/530, 534, 327/535, 537, 544, 545, 546

(56) References Cited

U.S. PATENT DOCUMENTS

| 4,437,095 A | | 3/1984 | Akahori et al. |
| 5,239,306 A | | 8/1993 | Siwiak et al. |
| 5,303,420 A | | 4/1994 | Jang |
| 5,606,313 A | | 2/1997 | Allen et al. |
| 5,615,162 A | * | 3/1997 | Houston ..................... 365/226 |
| 5,724,297 A | * | 3/1998 | Noda et al. ................. 365/226 |
| 6,104,937 A | | 8/2000 | Fujimoto |
| 6,124,749 A | * | 9/2000 | Morishima .................. 327/390 |
| 6,243,399 B1 | | 6/2001 | Kaewell et al. |
| 6,586,982 B2 | * | 7/2003 | Furusawa et al. ........... 327/225 |

FOREIGN PATENT DOCUMENTS

| EP | 0 829 967 A2 | 3/1998 |
| JP | 02-079526 | 3/1990 |
| JP | 2000-078661 | 3/2000 |

* cited by examiner

Primary Examiner—Jeffrey Zweizig

(57) ABSTRACT

A proposed semiconductor device is directed to making unnecessary circuit operation inactive to reduce power consumption because of leakage current. The device is functionally divided into blocks. The power supply systems of the blocks are divided into a non-controlled power supply group in which power is always on and controlled power supply groups in each of which groups a supply of power can be turned on/off independently. When a power supply system control part of the non-controlled power supply group outputs a control signal for power on, a power switch part turns on to release the controlled power supply group from the sleep mode, so that the first processing part starts intermittent operation. Only when it is determined that a first next-processing necessity determining part determines necessity of the next processing, a control signal is generated to activate the next power supply group. The blocks unnecessary for processing are not supplied with power, so that no leakage current flows and power consumption because thereof can be reduced.

12 Claims, 10 Drawing Sheets

SEMICONDUCTOR DEVICE AND PORTABLE TERMINAL EQUIPMENT

CROSS-REFERENCE TO RELATED APPLICATIONS

This application is based upon and claims priority of Japanese Patent Application No.2002-006406, filed on Jan. 15, 2002, the contents being incorporated herein by reference.

BACKGROUND OF THE INVENTION (1) Field of the Invention

The present invention relates to semiconductor devices and portable terminal equipment, and more particularly, to a semiconductor device that realizes power reduction in such a manner that a supply of power to part of the internal circuit is periodically turned on and off in a standby mode in which no communication takes place, such as a baseband LSI (Large-Scale Integration) in W-CDMA (Wideband Code Division Multiple Access), and portable terminal equipment using such a semiconductor device.

(2) Description of the Related Art

Recently, the LSI fabrication process has improved the minimum feature length, and has realized a transistor having a gate of 0.10 μm is close at hand. Miniaturization increases integration of mounting transistors, while requiring reduction in the threshold voltage that defines LSI operation. This would result in increase in leakage current that flows through transistors in standby mode. That is, a large current flows only by power on even when the circuit is not in the active mode. This is an essential problem. Battery-driven portable terminal equipment, such as a cellular phone, is required to keep the internal circuit in standby mode. Increase in leakage current would bring about various practical problems such as shortening of the continuous talk time and standby time.

FIG. 9 is a flowchart of an intermittent receiving in the W-CDMA communication system, and FIG. 10 is a timing chart of control timing in the intermittent receiving.

Terminal equipment is called by a base station in the W-CDMA communication system as follows.

In standby mode, a supply of power to hardware MHW and its processor (DSP: Digital Signal Processor) in a modem part of the equipment as well as hardware CHW and its processor CDSP in a channel codec part is periodically turned off (sleep mode) and on (sleep-released mode) every two seconds, for example, every 1.2 seconds, and intermittent receive takes place as long as power is on.

When intermittent receive starts from the sleep mode of the terminal equipment (step S1), a supply of power to the modem part and the channel codec part is turned on (step S2), and the processor CDSP of the channel codec part start the boot process (step S3). Next, the modem part receives a signal over PICH (paging Indicator Channel) (step S4). The PICH is a channel for transferring a call indicator sent for notification of a call received at any of portable terminal equipment in a base station in which the location has been registered (in-group incoming call). The modem determines whether there is an in-group incoming call (step S5). The hardware CHW and its processor CDSP in the channel codec part are notified of the determination result.

If it is determined that there is no in-group incoming call, the modem part is switched to the sleep mode, and the hardware CHW and its processor CDSP in the channel codec part are switched to the sleep mode (steps S6 and S7). In contrast, it is determined that there is an in-group incoming call, the modem part receives the paging channel PCH immediately (about two seconds) soon thereafter (step S8), and determines if the in-group incoming call is directed to its own portable equipment by checking the paging channel PCH. The hardware CHW stores data of the paging channel PCH (step S9). The processor CDSP of the channel codec part sets a decode parameter (step S10) after it is determined there is an in-group incoming call. The hardware CHW of the channel codec part decodes the paging channel PCH by using the decode parameter set by the processor CDSP (Step S1).

As described above, the paging indicator channel PICH is a physical channel that can simply be determined only by demodulating (de-spreading and decision), while the paging channel PCH has been bit-interleaved and has been processed in error correction, needing a particular decoding process therefor.

In receive check processing, the paging indicator channel PICH is intermittently decoded (every 1.2 seconds) in modes other than the talk mode (in standby mode). A supply of power to the conventional baseband LSI is off (sleep status) during the time other than the intermittent receive. In contrast, power is supplied with all the circuits of the LST during the intermittent receive irrespective of whether there is a call.

However, complexity of the communication sequence in W-CDMA results in an extremely large circuit scale and makes it difficult to reduce power consumption.

In addition, recent improvement in the minimum feature scale would cause a larger leakage current, which is negligible as compared to the operating current and brings about difficulties in power reduction.

In the conventional art, leakage current flows in a circuit that is not originally needed to operate when there is no call in intermittent receive (sleep-released mode). This increases current consumption and shortens the continuous talk time and standby time.

SUMMARY OF THE INVENTION

Taking into consideration the above, it is an object of the present invention to provide a semiconductor device that makes unnecessary operation inactive and thus reduce power consumption because of leakage current.

The above object of the present invention is achieved by a semiconductor device having a plurality of blocks that are sequentially processed step by step. The semiconductor device includes power supply systems respectively provided in the plurality of blocks, the power supply systems being divided into a non-controlled power supply group in which power is always on and controlled power supply groups in each of which groups a supply of power can be turned on/off independently, the non-controlled power supply group comprising power system controller for controlling a timing for turning on/off a power supply system of at least one of the controlled power supply groups, each of the controlled power supply groups except a final stage thereof comprising next-processing necessity determining unit for determining whether processing at a next stage is needed on the basis of a result of determination processed in its own controlled power supply group.

The above object of the present invention is also achieved by a portable terminal wherein a supply of power to a block unnecessary for intermittent receive control processing during a time other than intermittent receiving in a standby mode, the portable terminal equipment comprising: timer, belonging to a non-controlled power supply group in which power is always on, for generating a first control signal that turns on a supply of power to a first controlled power supply group including a first block necessary for determination of in-group incoming call and turns off the supply of power during a time other than the intermittent receiving; first power switch for turning on/off a supply of power to the first controlled power supply group in accordance with the first control signal from the timer; incoming call determining unit, belonging to the first controlled power supply group, for generating a second control signal that turns on/off a power supply to a second controlled power supply group including a second block necessary for processing an incoming call on the basis of determination of an in-group incoming call by the first block; and second power switch for turning of/off power supply to the second controlled power supply group in response to the second control signal from the incoming call determining unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

First, a description will be given of the outline of the present invention with reference to the accompanying drawings.

Figure 1:
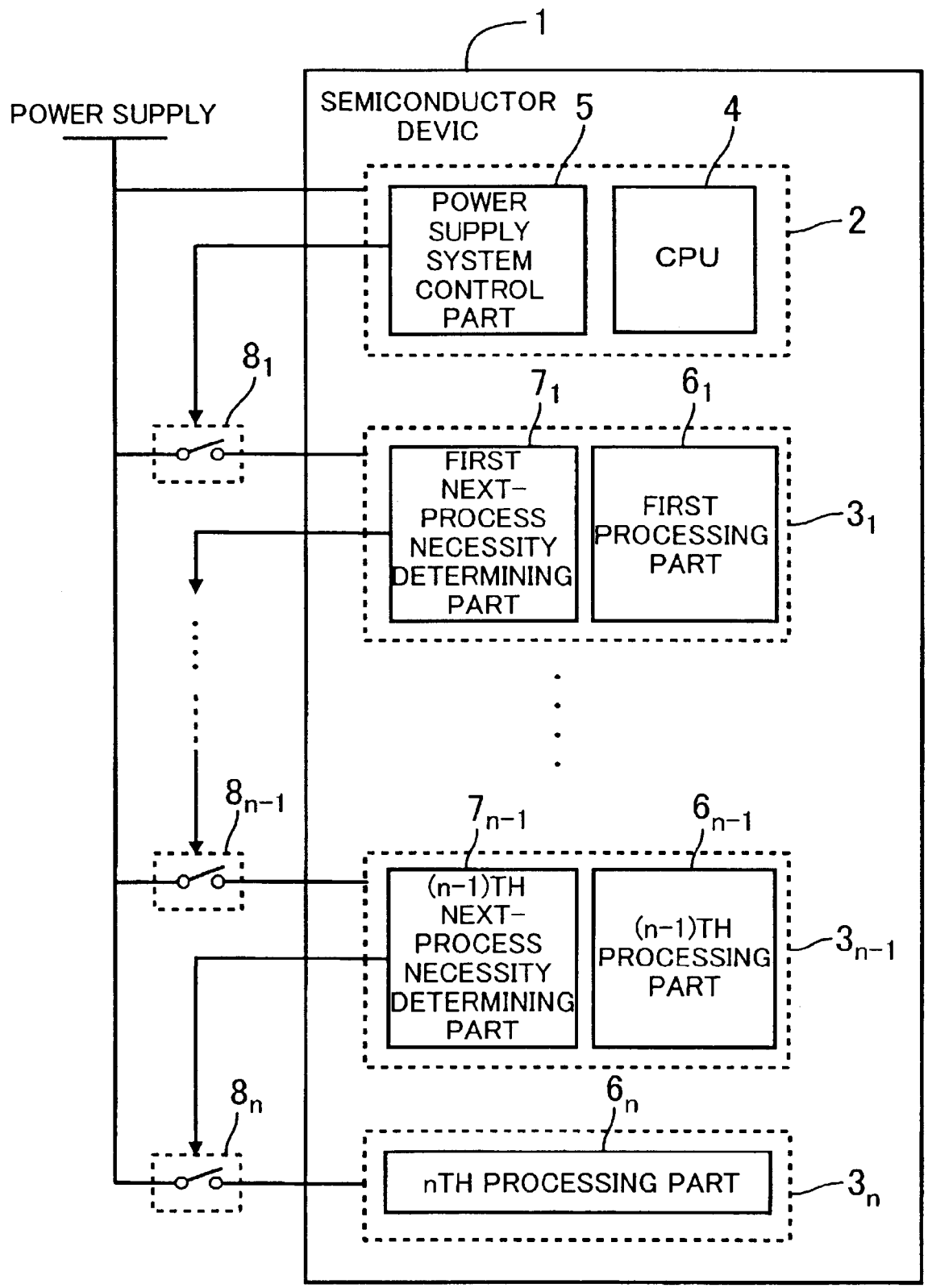
FIG. 1 is a diagram of a principal structure of a semiconductor device according to the present invention.

FIG. 1 shows a principal structure of a semiconductor device of the present invention.

A semiconductor device 1 of the present invention is functionally segmented into blocks, and power supply systems associated with the respective blocks are divided into a non-control power supply group 2 and controlled power supply groups $3_1$ to $3_n$. In the non-controlled power supply group 2, power supply is always on. In each of the controlled power supply groups $3_1$ to $3_n$, a supply of power can be controlled to on and off independently.

The non-controlled power supply group 2 includes a CPU (Central Processing Unit) 4 that controls the entire semiconductor device 1, and a power supply system control part 5. The part 5 is a block that controls the timings of turning on and off at least one of the controlled power supply groups $3_1$ to $3_n$.

The first through (n–t)th controlled power supply groups $3_1$ to $3_{n-1}$ have first through (n–1)th processing parts $6_1$ to $6_{n-1}$, and first through (n–1)th next-processing necessity determining parts $7_1$ to $7_{n-1}$. The first through (n–1)th processing parts $6_1$ to $6_{n-1}$ perform processing in the respective groups. The next-processing necessity determining parts $7_1$ to $7_{n-1}$ determine whether processing by a block in another group is needed by referring to the results of processing by the first through (n–1)th processing parts $6_1$ to $6_{n-1}$, respectively. The n-th controlled power supply group $3n$ includes the nth processing part $6_n$ only.

In the semiconductor device thus configured, the non-controlled power supply group 2 is directly connected to an external power supply, and the first through nth controlled power supply groups $3_1$ to $3_n$ are connected to the external power supply via power switch parts $8_1$ to $8_n$.

The first power switch part $8_1$ is controlled by the power supply system control part 5 of the non-controlled power supply group 2. The first next-processing necessity determining part $7_1$ is connected so as to turn on/off the power switch part of the controlled power supply group of the next stage. A similar connection is made for the controlled power supply groups of each stage following the above-mentioned next stage. The (n–1)th next-processing necessity determining part $7_{n-1}$ in the (n–1)th controlled power supply group $3n$ is connected so as to turn on/off the power switch part $8_n$ that controls the power supply system of the nth controlled power supply group $3n$.

In the semiconductor device 1 having the above-mentioned structure, the power supply system control part 5 of the non-controlled power supply group 5 in which power is always on outputs a control signal that turns on the power supply system of the first controlled power supply group $3_1$ when processing by the first processing part $6_1$ in the first controlled power supply group $3_1$ is needed. Further, the part 5 outputs another control signal that turns off the power supply system of the first controlled power supply group $3_1$ when processing by the first processing part $6_1$ is no longer needed.

When the part 5 outputs the power-on control signal in the sleep mode in which power supplies to the first through nth controlled power supply groups $3_1$ to $3$, are off, the power switch part $8_1$ is turned on, so that the first group $3_1$ can be released from the sleep mode. This causes the first next-processing necessity determining part $7_1$ to initiate intermittent operation. If the result of processing shows that the part $7_1$ does not need the next processing, the power switch part $8_1$ is turned off by the power-off control signal sent by the power supply system control part 5 when a given time elapses, the controlled power supply group $3_1$ thus returning to the sleep mode.

If the first next-processing necessity determining part $7_1$ determines the necessity of the next processing due to the result of the intermittent processing by the first processing part $6_1$, the first next-processing necessity determining part $7_1$ outputs the power-on control signal, thus controlling the next controlled power supply group to the sleep releasing mode, so that processing can be caused to start.

If the result of the processing of the processing unit of the controlled power supply group thus initiated shows that there is no next processing, the processing is interrupted, and all controlled power supply groups sequentially released from the sleep mode by the flow of processing up to now are turned off, and are thus caused to return to the sleep mode.

In processing that is taken over step by step in the semiconductor device 1, the groups needed for processing are sequentially powered, while power supplies to the remaining groups subsequent thereto are off. Thus, no leakage current flows in the remaining groups, so that power consumption can be minimized.

The configuration shown in FIG. 1 may be modified so that the power switch parts are integrally provided in the semiconductor device 1. In this modification, if the circuit scale of the controlled power group of one function, the group may be divided into groups in order to prevent huge current from concentrating on one power switch part. The divided groups are connected to respective power switch parts, which may be simultaneously controlled by the power supply system control part 5 or the next-processing necessity determining part.

A description will now be given of an embodiment of the present invention in which the present invention is applied to a W-CDMA baseband LSI.

Figure 2:
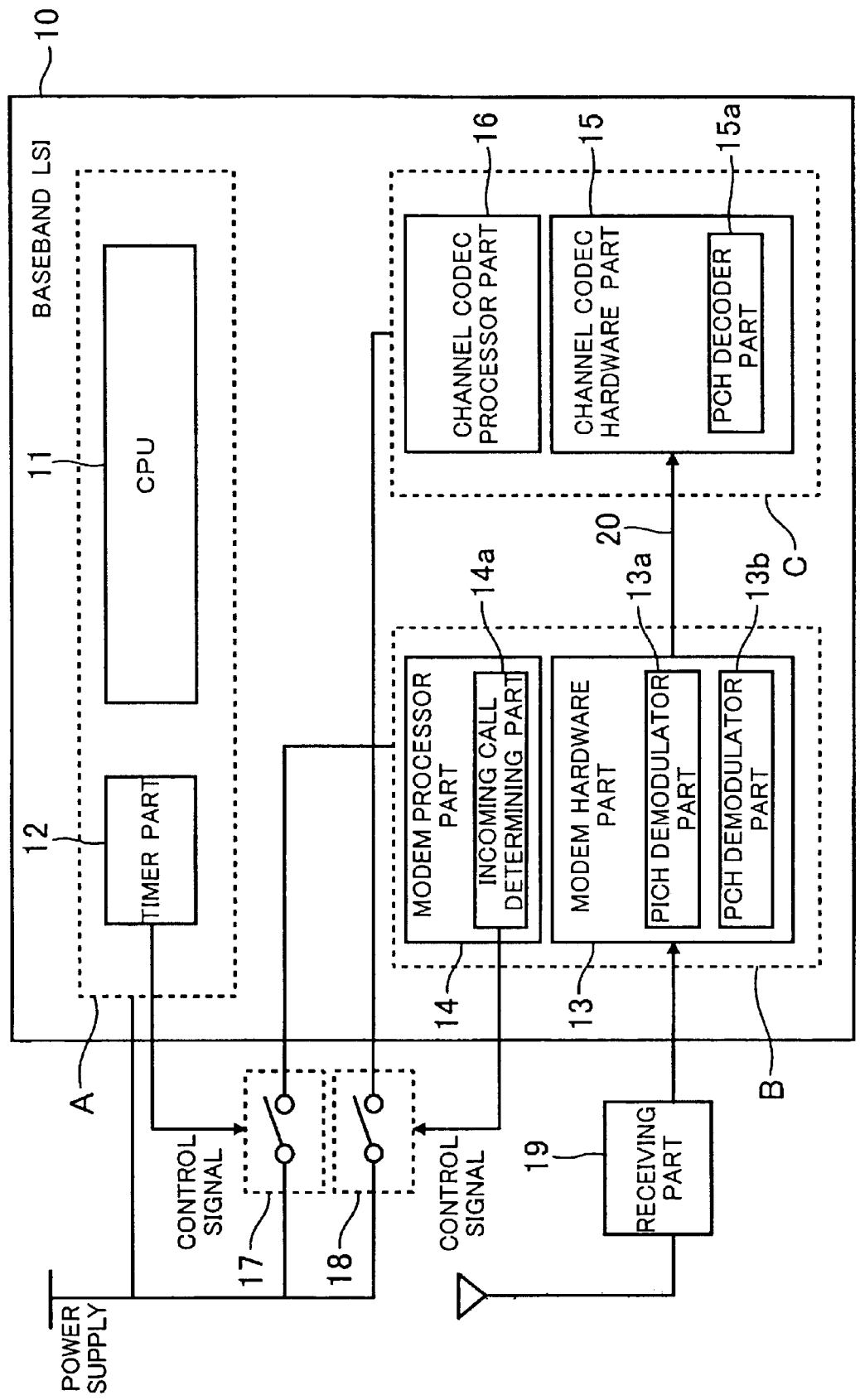
FIG. 2 is a block diagram of a structure of a baseband LSI according to a first embodiment of the present invention.

FIG. 2 is a block diagram of a structure of the baseband LSI according to the present embodiment of the invention.

A baseband LSI 10 is equipped with a CPU 11, which controls the entire baseband LSI 10, and a timer part 12, which controls the timing of intermittent receiving. The CPU 11 and the timer part 12 belong to a power supply group A with which power is always supplied.

The baseband LSI 10 is equipped with a modem part, which includes a modem hardware part 13 and a modem processor 14. The hardware part 13 demodulates the received signal from a receiving part 19. The modem processor part 14 collaborates with (controls) the modem hardware part 13. The modem part belongs to a power supply group B, which is powered at the time of intermittent receiving. The modem hardware part 13 has a PICH demodulator part 13a that demodulates the paging indicator channel PICH, and a PCH demodulator part 13b that demodulates the paging channel PCH. The modem processor part 14 has an incoming call determination part 14a.

Further, the baseband LSI 10 is equipped with a channel codec part, which has a channel codec hardware part 15, which decodes data from the modem hardware part 13, and a channel codec processor part 16, which collaborates with (controls) the channel codec hardware part 15. The channel codec part belongs to a power supply group C, which is not powered until a call is received. The channel codec hardware part 15 has a PCH decoder part 15a, which decodes the paging channel PCH.

The power supply system of the power supply group A is directly connected to an external power supply (battery), and the power supply system of the power supply group B is coupled to the external power supply via a power switch 17. The power supply system of the power supply group C is coupled to the external power supply via a power switch 18. The power switch 17 switches over by a control signal from the timer part 12 of the power supply group A. The power switch 18 is controlled by a control signal from the incoming call determination part 14a of the modem processor 14.

The modem hardware part 13 is provided with a hardware line 20 over which a parameter necessary for initial processing is passed until the channel codec processor part 16 is booted with respect to the channel codec hardware part 15.

The baseband LSI 10 thus configured operates as follows.

Figure 3:
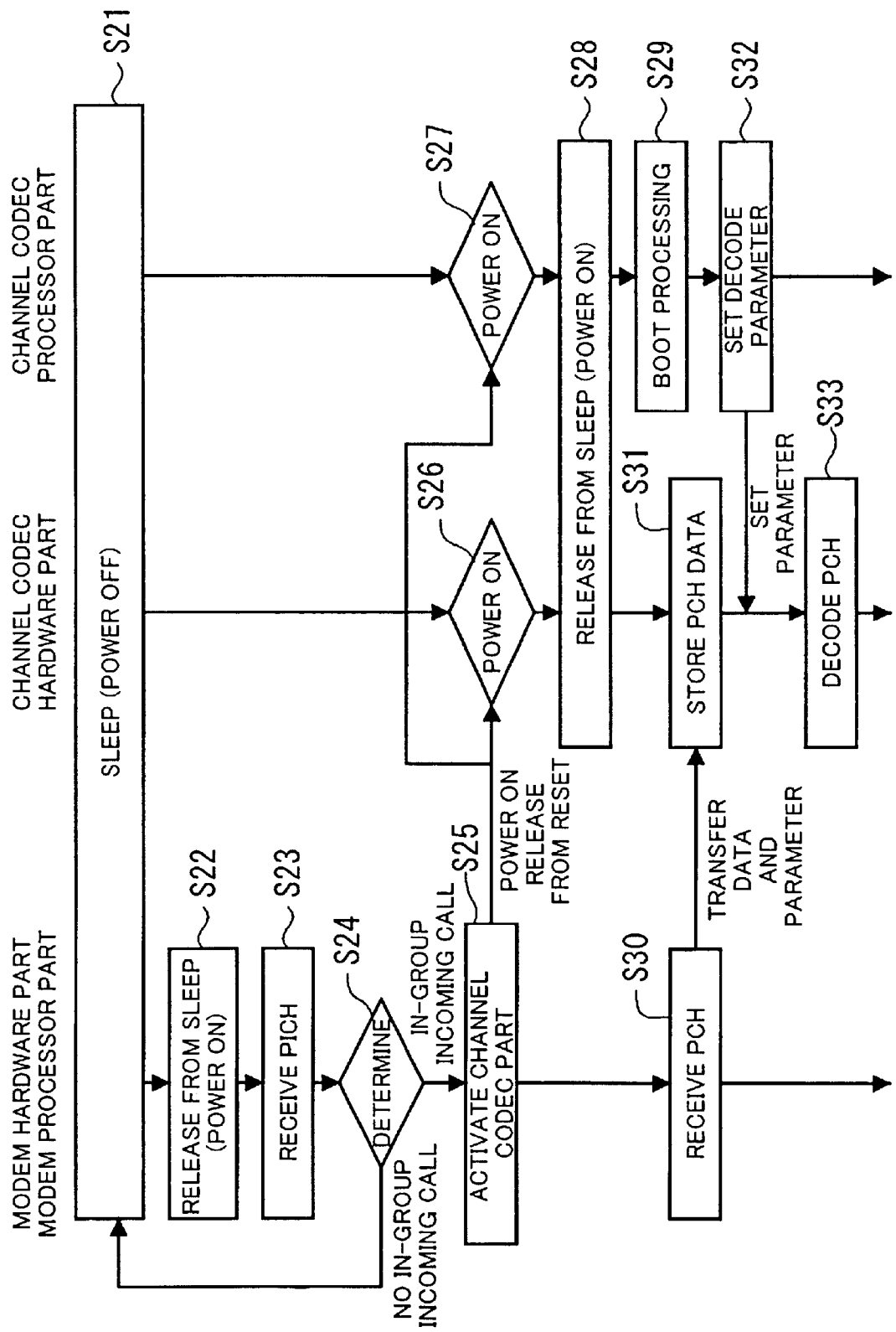
FIG. 3 is a flowchart of an intermittent receiving operation in the baseband LSI.
Figure 4:
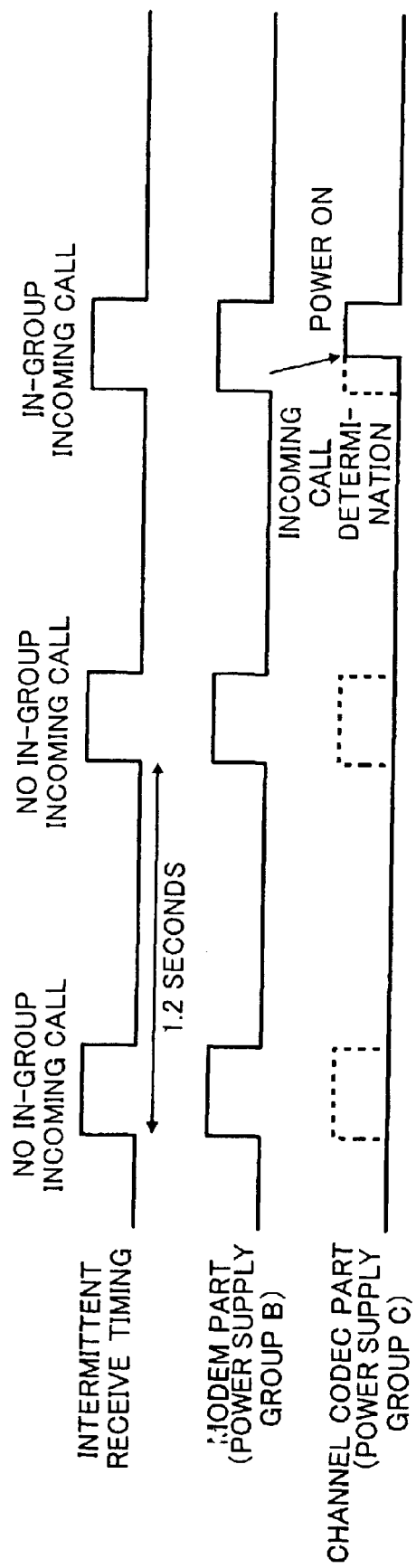
FIG. 4 is a timing chart of a control timing of the intermittent receiving operation.

FIG. 3 is a flowchart of an intermittent receiving operation in the baseband LSI, and FIG. 4 is a timing chart of control timings of the intermittent receiving operation.

In the baseband LSI 10, the CPU 11 and the timer part 12 of the power supply group A are always active in the standby mode. The timer part 12 outputs a control signal for intermittent receiving to the power switch 17 every 1.2 seconds It is now assumed that the power supplies to the groups B and C are off, so that the modem hardware part 13 and modem processor part 14 of the modem part and the channel codec hardware part 15 and channel codec processor part 16 of the channel codec part are in the sleep mode (step S21).

When the power switch 17 is turned on in response to the control signal from the timer part 12, a supply of power to the group B is initiated, so that the modem hardware part 13 and the modem processor part 14 are released from the sleep mode (step S22). Next, the modem hardware part 13 inputs the paging indicator channel PICH received by the receiving part 19, and demodulates it at the PICH demodulator part 13a (step S23). The incoming call determination part 14a of the modem processor part 14 determines whether there is an in-group incoming call by referring to the demodulated paging indicator channel PICH (step S24). If there is no in-group incoming call, the power switch 17 is turned off by the control signal from the timer 12, so that the power supply group B switches over to the sleep status. That is, if there is no in-group incoming call, only the power supply group B is active without supplying power to the block C.

If the incoming call determination part 14a determines that there is an in-group incoming call, it turns on the power switch 18 to activate the channel codec part 8 (step S25). That is, as shown in FIG. 4, power is not supplied to the power supply group C until the in-group incoming call is confirmed by the determination by the modem part of the power supply group B. By initiating a supply of power to the group C, the channel codec group is released from the reset status, and a supply of power to the channel codec hardware part 15 and the channel codec processor part 16 is turned on (steps S26 and S27). This releases the channel codec hardware part 15 and the channel codec processor part 16 from the sleep mode (step S28), and the channel codec processor 16 starts boot processing (step S29).

The modem part inputs the paging channel PCH received by the receiving part 19 after the channel codec part is activated, and demodulates it at the PCH demodulator part 13b (step S30). Next, the modem part transfers the demodulated paging channel PCH and parameters necessary for initial processing of the paging channel PCH of the channel codec hardware part 15 thereto over the hardwire line 20. The channel codec hardware part 15 memories data of the paging channel PCH and the parameters transferred from the modem part, and performs the initial processing for the paging channel PCH such as an interleaving process by using the transferred data (step S31). During that time, the channel codec processor part 16 completes the boot process, and sets the decode parameters (step S32). The channel codec hardware part 15 performs the decode process that is the remaining process for the paging channel PCH by using the decode parameters set by the channel codec processor part 16 (step S33).

In the above-mentioned intermittent receive operation, the channel codec hardware part 15 separately performs the first half of the processing for the paging channel PCH after releasing from the sleep mode and the second half thereof, while the first half uses the parameters transferred from the modem part and the second half collaborates with the channel codec processor part 16. The above separate process will now be described.

Figure 5:
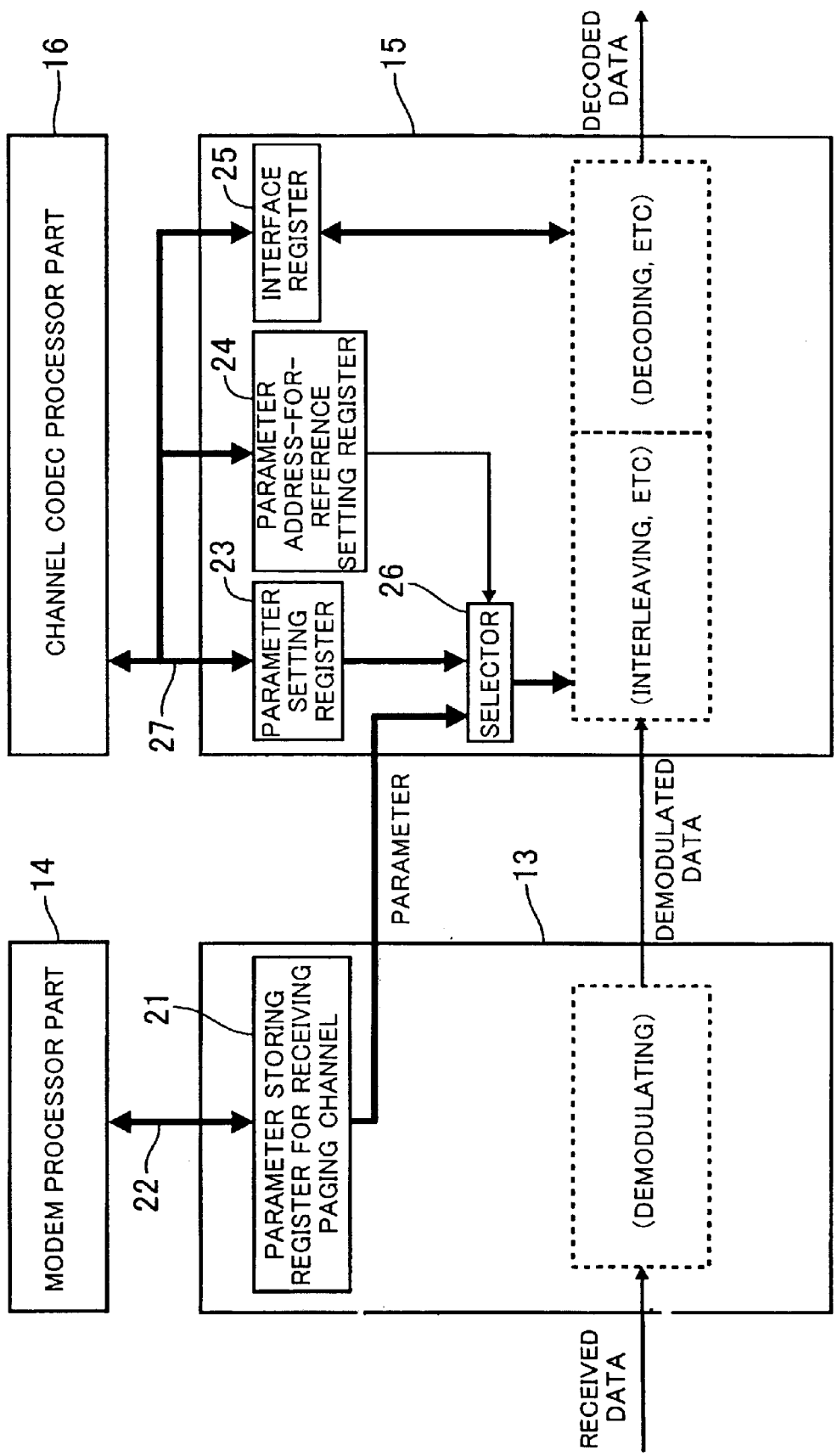
FIG. 5 is a view of a parameter interface between a modem part and a channel codec part.
Figure 6:
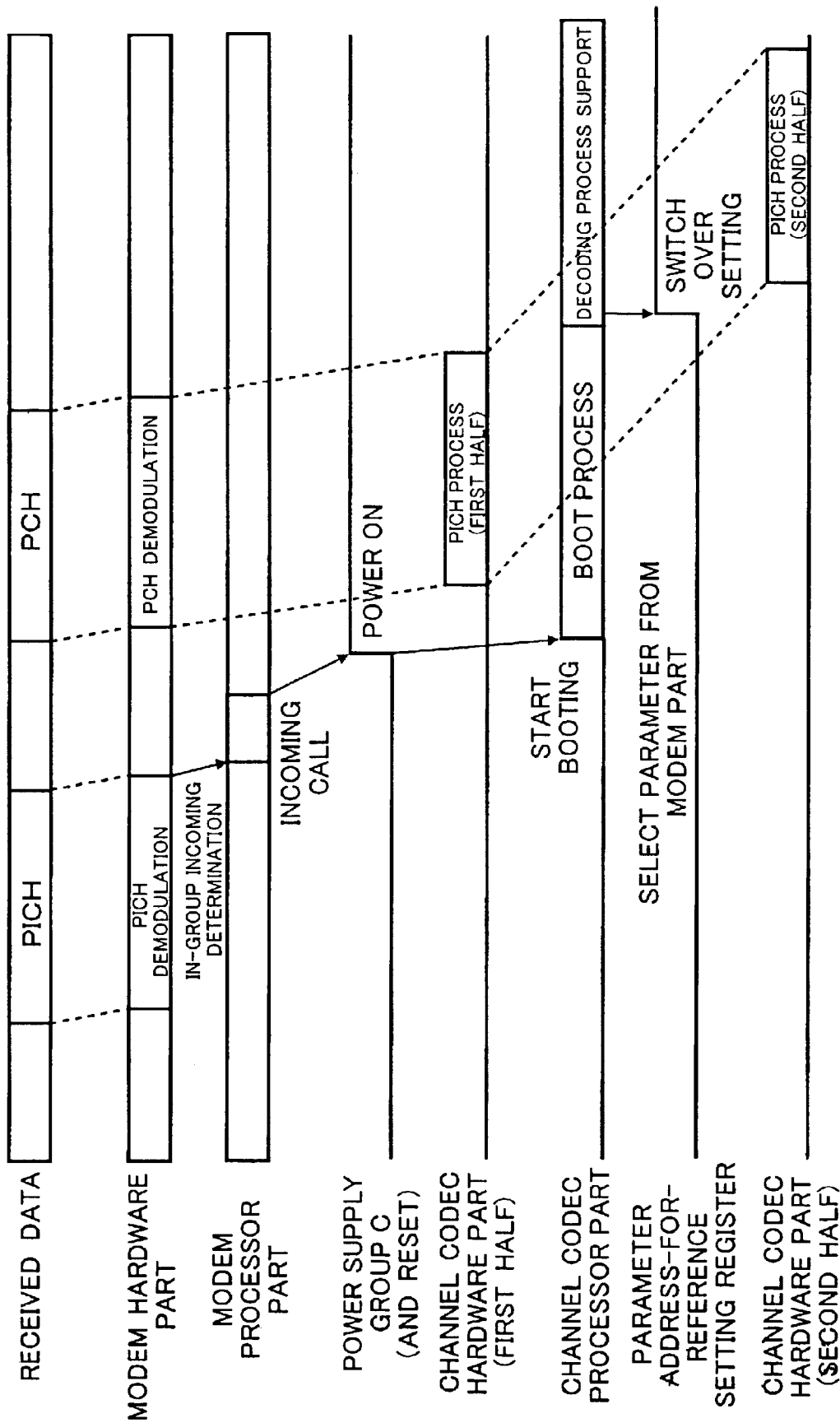
FIG. 6 is a view of processing timing between the modem part and the channel codec part.

FIG. 5 shows a structure of a parameter interface between the modem part and the channel codec part, and FIG. 6 is a timing chart of processing between the modem part and the channel codec part.

The modem hardware part 13 of the modem part is equipped with a register 21 for storing a paging channel receives parameter. The register 21 is coupled with the modem processor 14 via a bus 22. The channel codec hardware part 15 of the channel codec part is equipped with the functions of a parameter setting register 23, a parameter address-for-reference setting register 24, an interface register 25 and a selector 26. The registers 23 to 25 are connected to the channel codec processor part 16 via a bus 27. The selector 26 selects either the parameter in the register 21 of the modem hardware part 13 or that in the register 23 of the channel codec hardware part 15 on the basis of an instruction in the register 24. The parameter selected by the selector 26 is used for processing such as interleaving of the paging channels PCH. The data stored in the interface register 25 from the channel codec processor part 16 is used for demodulating the paging channel PCH.

This structure is based on the arrangement in which the channel codec processor part 16 is put in the same power supply group C in addition to the channel codec hardware part 15 in the channel codec part. Thus, the channel codec processor part 16 is required to perform the boot processing for initializing the program data and table date immediately after the power supply is turned on. In some cases, the channel codec processor part 16 may not be able to return during the period (about 2 seconds) until the associated paging channel PCH is received after the paging indicator channel PICH is identified. In order to make ready for the above-mentioned cases, a minimum parameter for enabling the channel codec hardware part 15 alone to start processing without support by the channel codec processor part 16 is passed from the modem part that is already power on via the hardware line 20, so that the channel codec hardware part 15 can process data of the paging channel PCH such as interleaving in advance. For example, only the parameter related to the data format of the paging channel PCH is passed as the minimum parameter.

Next, a description will be given of the flow in the operations of the modem part and the channel codec part carried out when the in-group incoming call occurs.

First, when the received data contains the paging indicator channel PICH after the power supply group B is released from the sleeping state, the modem hardware part 13 demodulates the paging indicator channel PICH. Then, the modem processor part 14 makes a decision on the in-group call incoming. If the in-group incoming call occurs, a supply of power to the power supply group C is turned on, so that the channel codec processor part 16 starts booting. At that time, the parameter address-for-reference setting register 24 is released from the reset state due to power on, and the selector 26 selects the parameter from the modem part as the initial value that should be registered therein.

The modem hardware part 13 demodulates the paging channel PCH following the paging indicator channel PICH, and passes demodulator data to the channel codec hardware part 15 together with the parameter necessary for processing data of the paging channel PCH. The channel codec hardware part 15 performs data processing of the paging channel PCH (the first half of processing) with the parameter from the modem part. The subsequent demodulation processing and processing for CRC (Cyclic Redundancy Check) bits may not be performed without support by the channel codec processor part 16. Therefore, data is stored in the interleave memory used in the interleaving process after the first half of the process for the parameter from the channel codec hardware part and the modem part in the channel codec part is completed. Then, the part waits for completion of booting by the channel codec processor part 16.

After completing the boot processing, the channel codec processor part 16 starts supporting decoding of the paging channel PCH, and sets the parameter in the parameter setting register 23, switching over the selector 26 to the parameter setting register 23 by referring to the parameter address-for-reference setting register 24. The channel codec hardware part 15 performs the second half of processing for the paging channel PCH by using the parameter in the parameter setting register 23 in collaboration with the channel codec processor part 16.

As described above, in the channel codec hardware part 15, the initial status after power on (releasing from the reset status) refers to the parameters from the modem part, and the subsequent processing refers to the parameters from the channel codec processor part 16 after the channel codec processor part 16 completes the boot processing and is restored. This makes it possible to handle future channel data other than the paging channel PCH. Further, regular processing can be performed by changing the setting in the parameter address-for-reference setting register 24 after completion of booting by the channel codec processor part 16 even when power is on besides intermittent receiving.

Figure 7:
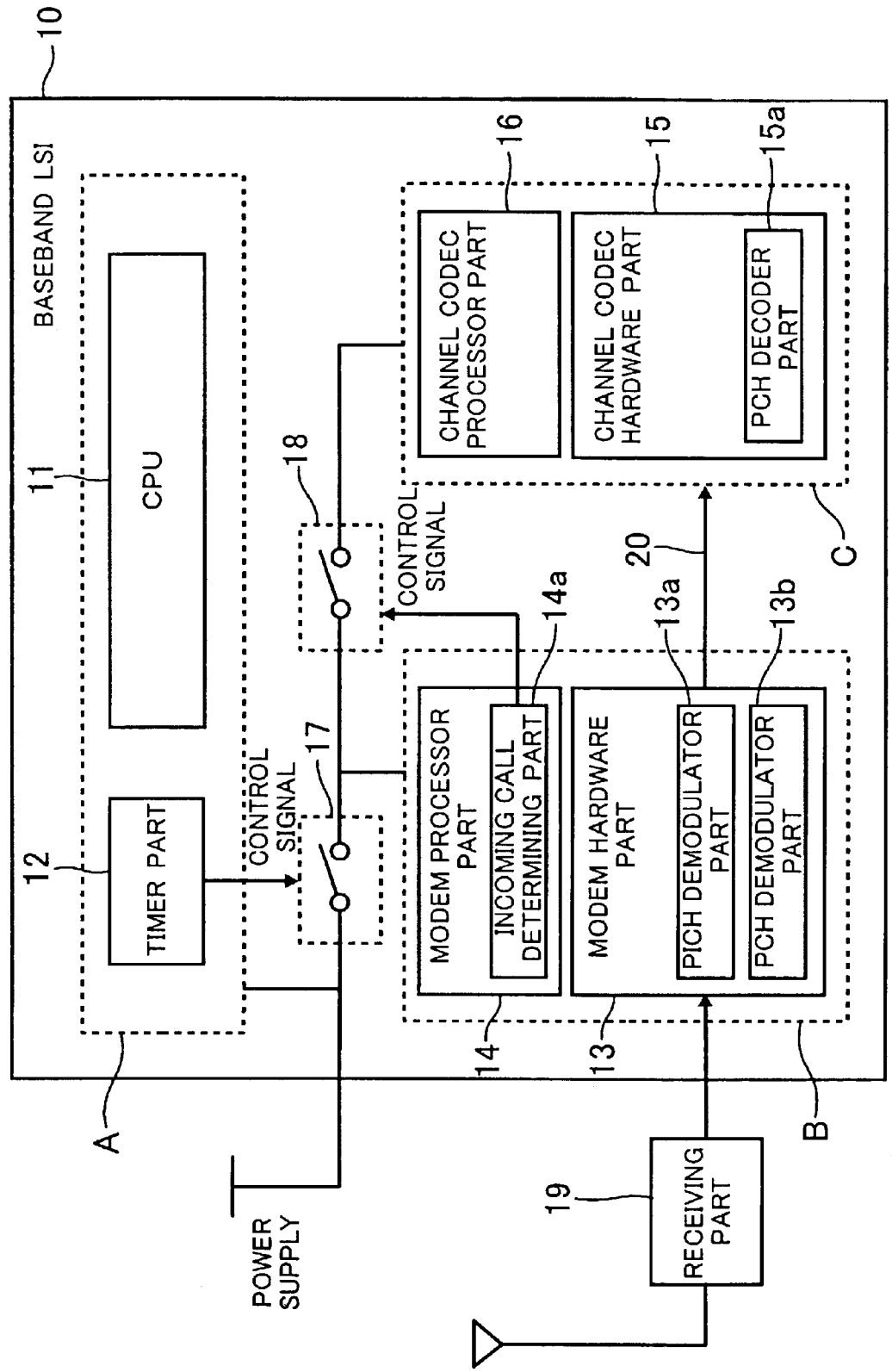
FIG. 7 is a block diagram of a structure of a baseband LSI according to a second embodiment of the present invention.

FIG. 7 is a block diagram of a baseband LSI according to a second embodiment of the present invention. In FIG. 7, parts that are the same as those shown in FIG. 2 are given the same reference numerals, and a description thereof will be omitted.

In the second embodiment, the power switches B and C respectively associated with the power supply groups B and C are provided in the baseband LSI 10. The structure and operation of the baseband LSI 10 other than the above are the same as those in the first embodiment The power switches 17 and 18 in the baseband LSI 10 may be realized with MT-CMOS (Multi-Threshold CMOS). The MT-CMOS is the combination of transistors that respectively have high and low threshold voltages. As compared to a switch realized by transistors of the same threshold value, the MT-CMOS switch can realize drastic reduction in leakage current. Reduction in leakage current can be used as an on-chip power switch for blocks into which the inside of the baseband LSI 10 is divided.

Figure 8:
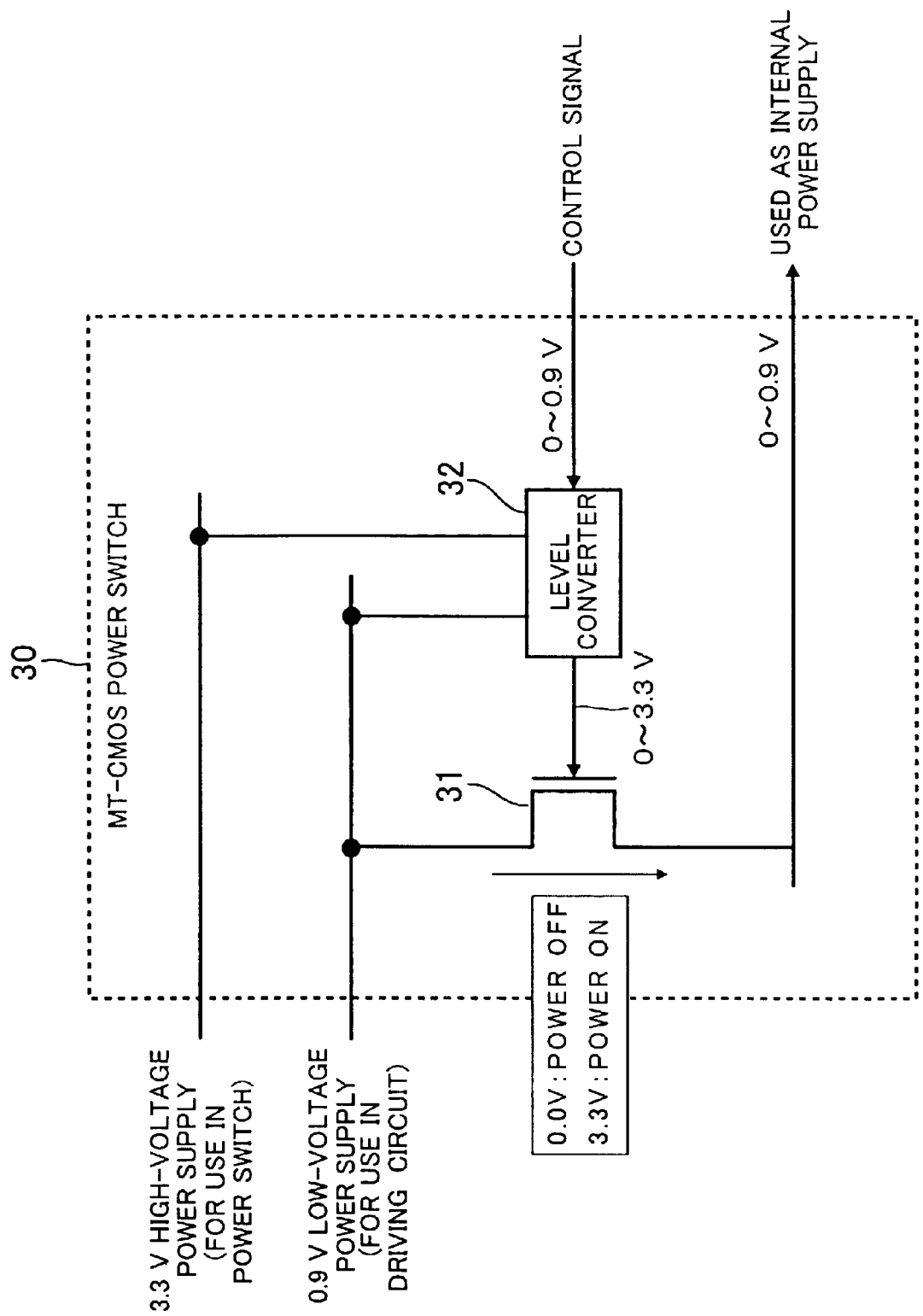
FIG. 8 is a diagram of a power switch of MT-CMOS.
Figure 9:
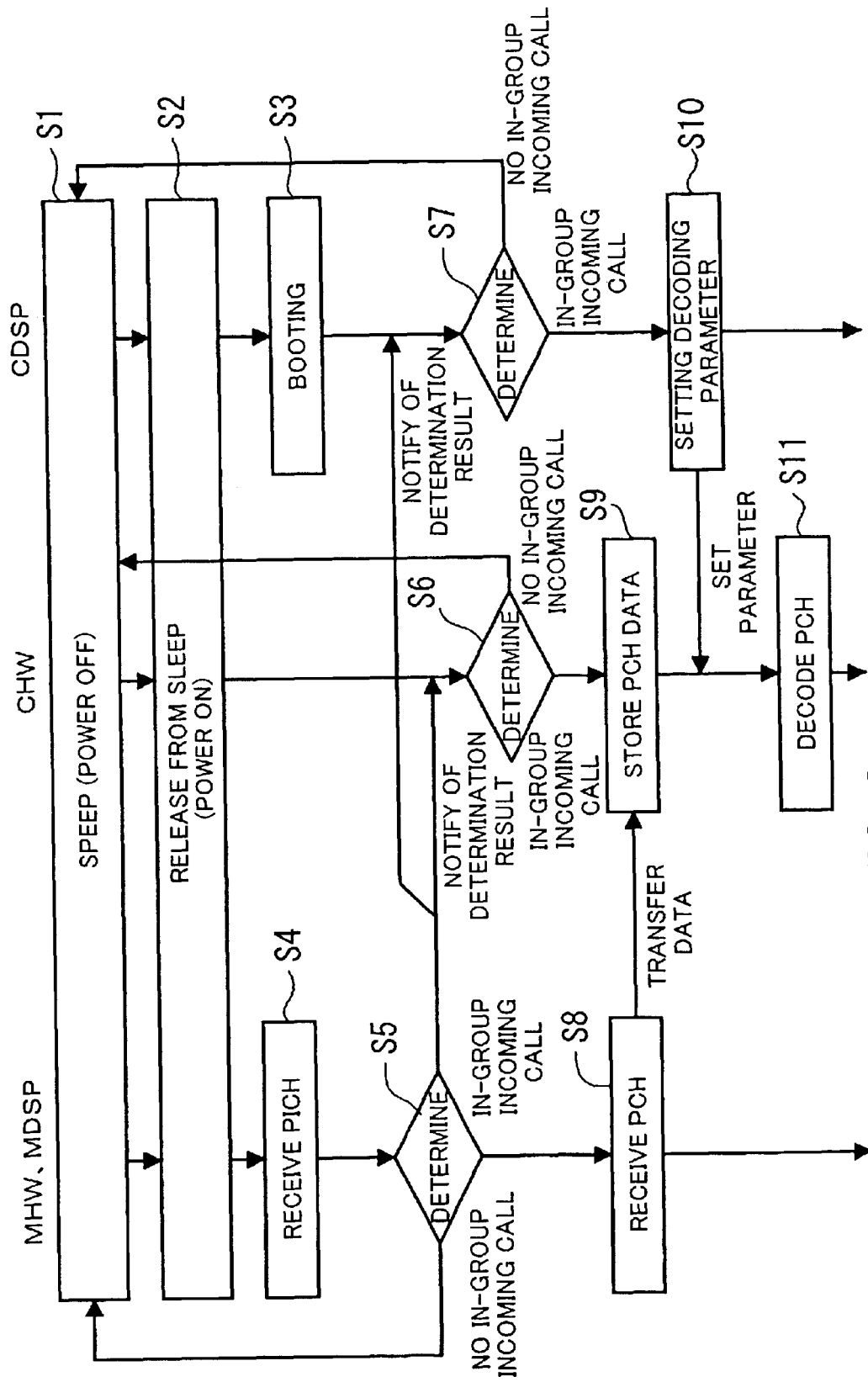
FIG. 9 is a flowchart of intermittent receiving in W-CDMA.
Figure 10:
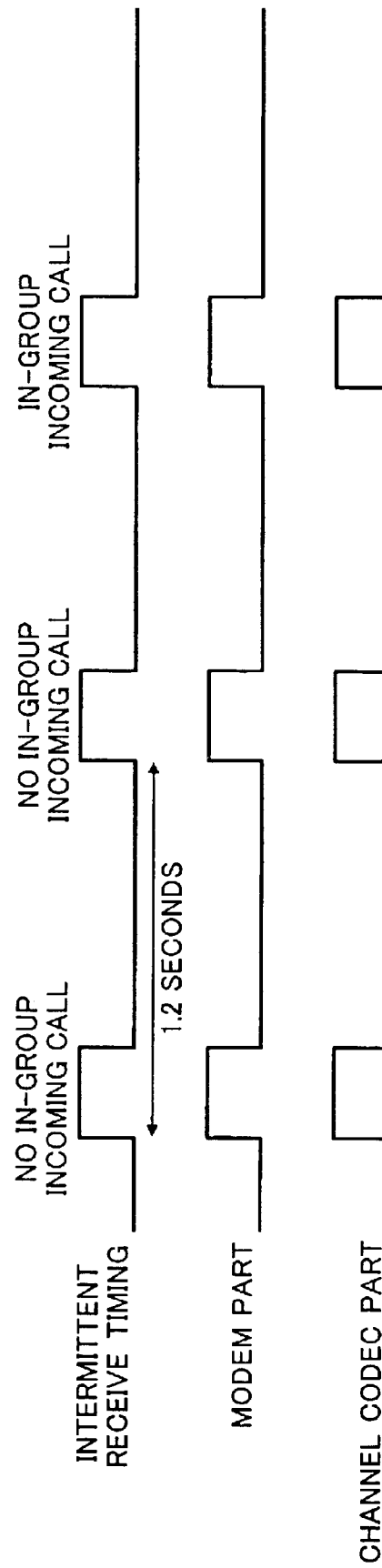
FIG. 10 is a timing chart of control timing in intermittent receiving operation.

FIG. 8 shows an example of the MT-CMOS power switch.

An MT-CMOS power switch 30 is equipped with a transistor $3_1$ and a level converter 32. The level converter 32 inputs a control signal that swings between 0 V and 0.9 V generated by another power supply group (timer part 12 and incoming call determination part 14a), and produces therefrom a voltage of 0.9 V that serves as a low power supply voltage for driving the circuits, and a voltage of 3.3 V that serves as a high power supply voltage for power switch control. The high power supply voltage is used for controlling the power switches connected to the other blocks in the same power supply group.

The 0.9 V power supply voltage is connected to the drain terminal of the transistor 31, and the 3.3 V power supply voltage is connected to the gate terminal thereof in the level converter 32. The source terminal of the transistor $3_1$ is connected to an inner power supply line in the block subject to power control.

A switching sequence in the power switch 30 thus configured will now be described.

In a case where a voltage of approximately 0 V is applied to the level converter 32 by the control signal generated by an internal circuit in a group other than the group controlled by the power switch 30, the level converter 32 does not perform level conversion. Thus, the gate voltage of the transistor 32 is 0V, so that it is cut off and the power switch 30 is off.

Next, when a voltage of 0.9 V is applied to the level converter 32 as the control signal, the level converter 32 converts boosts the 0.9 V voltage to 3.3 V. The 3.3 V voltage is applied to the gate terminal of the transistor 31, and the 0.9 V voltage output from the level converter 32 is applied to the drain terminal thereof. Thus, the transistor 31 is turned on and the power switch 30 is also turned on, so that the internal circuit can be activated.

As described above, according to the present invention, the inner circuitry of the semiconductor device is divided into blocks, which are grouped into the non-controlled power supply group in which the power supply is always on and a plurality of controlled power supply groups in which power supply is independently controlled, wherein on/off control of power supply is performed in processing order for each controlled power supply group. Thus, in the application of the present invention to the baseband LSI designed to W-CDMA, the on-chip power supply control is combined to the intermittent receiving control. First, power is supplied to only the modem part during intermittent receiving (releasing from the sleep mode), and the paging indicator channel is demodulated. Only if an incoming call is determined, power is supplied to the channel codec part, while the channel codec part is continuously supplied with no power if there is no incoming call. In intermittent receiving, if there is no in-group incoming call, the channel codec part is supplied with no power, so that no current flows therein. It is therefore possible to reduce power consumption in standby mode and lengthen the standby time.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A semiconductor device equipped with a plurality of blocks that are sequentially processed step by step, comprising:

power supply systems respectively provided in the plurality of blocks, the power supply systems being divided into a non-controlled power supply group in which power is always on and controlled power supply groups in each of which groups a supply of power can be turned on/off independently, the non-controlled power supply group comprising power system control means for controlling a timing for turning on/off a power supply system of at least one of the controlled power supply groups, each of the controlled power supply groups except a final stage thereof comprising next-processing necessity determining means for determining whether processing at a next stage is needed on the basis of a result of determination processed in its own controlled power supply group.

2. The semiconductor device according to claim 1, further comprising first power switch means for turning on/off the power supply system of said at least one of the controlled power supply groups in accordance with a control signal from said power supply system control means.

3. The semiconductor device according to claim 1, further comprising a plurality of second power switch means for turning on/off the power supply system of the controlled power supply group of a next stage in accordance with a control signal from the next-processing necessity determining means of the controlled power supply group of the next stage.

4. The semiconductor device according to claim 1, further comprising:

first power switch means for turning on/off the power supply system of said at least one of the controlled power supply groups in accordance with a control signal from said power supply system control means; and a plurality of second power switch means for turning on/off the power supply system of the controlled power supply group of a next stage in accordance with a control signal from the next-processing necessity determining means of the controlled power supply group of the next stage.

5. The semiconductor device according to claim 4, wherein the first and second power switch means have a MT-CMOS structure.

6. A portable terminal wherein a supply of power to a block unnecessary for intermittent receive control processing during a time other than intermittent receiving in a standby mode, the portable terminal equipment comprising:

timer means, belonging to a non-controlled power supply group in which power is always on, for generating a first control signal that turns on a supply of power to a first controlled power supply group including a first block necessary for determination of in-group incoming call and turns off the supply of power during a time other than the intermittent receiving;

first power switch means for turning on/off a supply of power to the first controlled power supply group in accordance with the first control signal from the timer means;

incoming call determining means, belonging to the first controlled power supply group, for generating a second control signal that turns on/off a power supply to a second controlled power supply group including a second block necessary for processing an incoming call on the basis of determination of an in-group incoming call by the first block; and second power switch means for turning of/off power supply to the second controlled power supply group in response to the second control signal from the incoming call determining means.

7. The portable terminal according to claim 6, wherein the non-controlled power supply group, the first controlled power supply group, the second controlled power supply group, the first power switch means and the second power switch means are included in a baseband LSI for W-CDMA.

8. The portable terminal according to claim 6, wherein the first block is a modem that demodulates received data.

9. The portable terminal according to claim 8, wherein the second block is a channel codec part that data demodulated by the modem.

10. The portable terminal according to claim 9, wherein the second block includes a processor that collaborates with the channel codec part.

11. The portable terminal according to claim 10, wherein the channel codec part comprises parameter selecting means for referring to a parameter for data receiving prepared in the modem during boot processing of the processor after the power supply to the second controlled power supply group, and switching over to a parameter from the processor after completion of the boot processing.

12. The portable terminal according to claim 11, wherein the parameter selecting means comprises a parameter setting register storing the parameter from the processor necessary for processing in the channel codec part, a selector selecting either the parameter from the modem or that in he parameter setting register, and a parameter address-for-reference setting part controlling an address for reference in the selector.

* * * * *

UNITED STATES PATENT AND TRADEMARK OFFICE
CERTIFICATE OF CORRECTION

PATENT NO. : 6,803,810 B2
DATED : October 12, 2004
INVENTOR(S) : Yamada et al.

It is certified that error appears in the above-identified patent and that said Letters Patent is hereby corrected as shown below:

Title page,
Item [73], Assignee, please correct the name and address to read as follows:
-- Fujitsu Limited, Kawasaki (JP) --

Signed and Sealed this

Eleventh Day of January, 2005

JON W. DUDAS
*Director of the United States Patent and Trademark Office*